United States Patent

Ohtani

(10) Patent No.: US 9,154,227 B2
(45) Date of Patent: Oct. 6, 2015

(54) PORT MONITORING DEVICE AND PORT MONITORING METHOD

(71) Applicant: FUJITSU LIMITED, Kawasaki-shi, Kanagawa (JP)

(72) Inventor: Toshihiro Ohtani, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 19 days.

(21) Appl. No.: 14/229,991

(22) Filed: Mar. 31, 2014

(65) Prior Publication Data

US 2014/0308035 A1    Oct. 16, 2014

(30) Foreign Application Priority Data

Apr. 16, 2013   (JP) ................... 2013-086104

(51) Int. Cl.
*H04B 10/08* (2006.01)
*H04B 10/079* (2013.01)
*H04J 14/02* (2006.01)

(52) U.S. Cl.
CPC .... *H04B 10/07955* (2013.01); *H04B 10/07957* (2013.01); *H04J 14/0221* (2013.01)

(58) Field of Classification Search
CPC ............... H04B 10/07955; H04B 10/07957; H04J 14/0221; H04Q 3/526; H04Q 3/528
USPC .................................... 398/38, 33
See application file for complete search history.

(56) References Cited

U.S. PATENT DOCUMENTS

| 7,660,530 | B2 * | 2/2010 | Mino .............................. 398/94 |
| 8,009,987 | B2 * | 8/2011 | Uchiyama et al. ............. 398/83 |
| 8,135,280 | B2 * | 3/2012 | Zong et al. ..................... 398/94 |
| 2006/0013585 | A1 * | 1/2006 | Hnatiw et al. ................. 398/38 |
| 2012/0121256 | A1 | 5/2012 | Suzuki et al. |
| 2013/0243424 | A1 * | 9/2013 | Shukunami .................... 398/34 |

FOREIGN PATENT DOCUMENTS

| JP | 2008-197043 | 8/2008 |
| JP | 2012-105222 | 5/2012 |

* cited by examiner

*Primary Examiner* — M. R. Sedighian
(74) *Attorney, Agent, or Firm* — Fujitsu Patent Center

(57) ABSTRACT

An OCM monitors a plurality of SW ports each receiving an optical signal by switching the SW ports. The OCM includes a PD, a control circuit, and an arithmetic circuit. The PD detects an optical power level on wavelengths spaced at predetermined intervals in each of the SW ports to be monitored. The control circuit determines, in each of the SW ports, whether arithmetic processing using a waveform estimated from the optical power level is executed, depending on presence or absence of a change in the optical power level detected by the PD. The arithmetic circuit performs the arithmetic processing by using the waveform when the control circuit determines execution of the arithmetic processing.

5 Claims, 11 Drawing Sheets

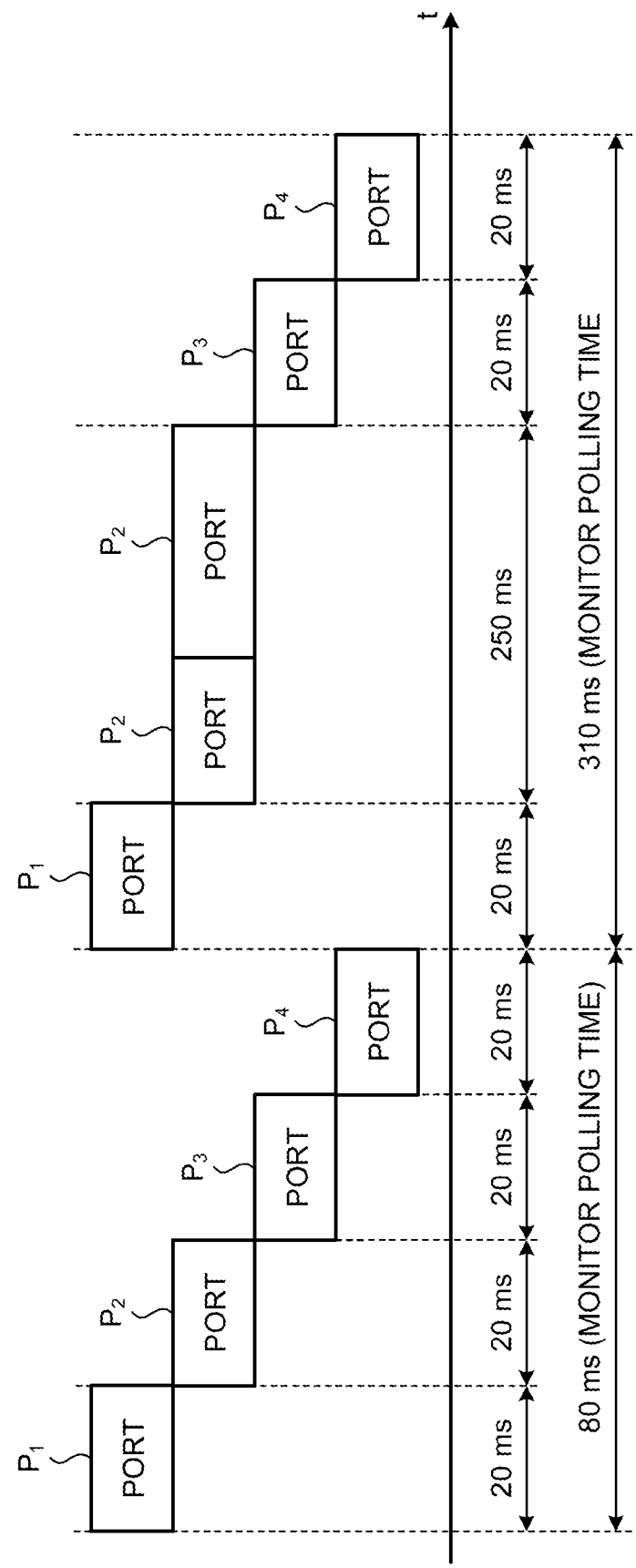

FIG.6A

| WAVELENGTHS [nm] | INITIAL OPTICAL POWER LEVEL [dBm] | OPTICAL POWER LEVEL AFTER CHANGE IN CENTRAL WAVELENGTH [dBm] | INCREASE OR DECREASE IN OPTICAL POWER LEVEL |
|---|---|---|---|
| 1548.0 | -63.617 | -68.448 | DECREASED |
| 1548.1 | -68.982 | -63.617 | INCREASED |
| 1548.2 | -60.783 | -68.982 | DECREASED |
| 1548.3 | -47.539 | -60.783 | DECREASED |
| 1548.4 | -42.661 | -47.539 | DECREASED |
| 1548.5 | -39.809 | -42.661 | DECREASED |
| 1548.6 | -41.129 | -39.809 | INCREASED |
| 1548.7 | -45.146 | -41.129 | INCREASED |
| 1548.8 | -53.330 | -45.146 | INCREASED |
| 1548.9 | -65.036 | -53.330 | INCREASED |
| 1549.0 | -63.886 | -65.036 | DECREASED |

FIG.6B

| WAVELENGTHS [nm] | INITIAL OPTICAL POWER LEVEL [dBm] | OPTICAL POWER LEVEL AFTER CHANGE IN CENTRAL WAVELENGTH [dBm] | INCREASE OR DECREASE IN OPTICAL POWER LEVEL |
|---|---|---|---|
| 1548.0 | -63.617 | -68.982 | DECREASED |
| 1548.1 | -68.982 | -60.783 | INCREASED |
| 1548.2 | -60.783 | -47.539 | INCREASED |
| 1548.3 | -47.539 | -42.661 | INCREASED |
| 1548.4 | -42.661 | -39.809 | INCREASED |
| 1548.5 | -39.809 | -41.129 | DECREASED |
| 1548.6 | -41.129 | -45.146 | DECREASED |
| 1548.7 | -45.146 | -53.330 | DECREASED |
| 1548.8 | -53.330 | -65.036 | DECREASED |
| 1548.9 | -65.036 | -63.886 | INCREASED |
| 1549.0 | -63.886 | -65.027 | DECREASED |

FIG.8A

| WAVELENGTHS [nm] | INITIAL OPTICAL POWER LEVEL [dBm] | OPTICAL POWER LEVEL AFTER INCREASE IN OPTICAL POWER [dBm] | INCREASE OR DECREASE IN OPTICAL POWER LEVEL |
|---|---|---|---|
| 1548.0 | -63.617 | -58.167 | INCREASED |
| 1548.1 | -68.982 | -63.982 | INCREASED |
| 1548.2 | -60.783 | -55.783 | INCREASED |
| 1548.3 | -47.539 | -42.539 | INCREASED |
| 1548.4 | -42.661 | -37.661 | INCREASED |
| 1548.5 | -39.809 | -34.809 | INCREASED |
| 1548.6 | -41.129 | -36.129 | INCREASED |
| 1548.7 | -45.146 | -40.146 | INCREASED |
| 1548.8 | -53.330 | -48.330 | INCREASED |
| 1548.9 | -65.036 | -60.036 | INCREASED |
| 1549.0 | -63.886 | -58.886 | INCREASED |

FIG.8B

| WAVELENGTHS [nm] | INITIAL OPTICAL POWER LEVEL [dBm] | OPTICAL POWER LEVEL AFTER DECREASE IN OPTICAL POWER [dBm] | INCREASE OR DECREASE IN OPTICAL POWER LEVEL |
|---|---|---|---|
| 1548.0 | -63.617 | -68.617 | DECREASED |
| 1548.1 | -68.982 | -73.982 | DECREASED |
| 1548.2 | -60.783 | -65.783 | DECREASED |
| 1548.3 | -47.539 | -52.539 | DECREASED |
| 1548.4 | -42.661 | -47.661 | DECREASED |
| 1548.5 | -39.809 | -44.809 | DECREASED |
| 1548.6 | -41.129 | -46.129 | DECREASED |
| 1548.7 | -45.146 | -50.146 | DECREASED |
| 1548.8 | -53.330 | -58.330 | DECREASED |
| 1548.9 | -65.036 | -70.036 | DECREASED |
| 1549.0 | -63.886 | -68.886 | DECREASED |

FIG.11

| WAVELENGTHS [nm] | INITIAL OPTICAL POWER LEVEL [dBm] | OPTICAL POWER LEVEL AFTER CHANGE IN CENTRAL WAVELENGTH [dBm] | DIFFERENCES [dB] | INCREASE OR DECREASE IN OPTICAL POWER LEVEL |
|---|---|---|---|---|
| 1548.0 | -63.617 | -63.666 | -0.05 | DECREASED |
| 1548.1 | -68.982 | -68.092 | +0.89 | INCREASED |
| 1548.2 | -60.783 | -62.878 | -2.10 | DECREASED |
| 1548.3 | -47.539 | -48.329 | -0.79 | DECREASED |
| 1548.4 | -42.661 | -43.047 | -0.39 | DECREASED |
| 1548.5 | -39.809 | -39.934 | -0.13 | DECREASED |
| 1548.6 | -41.129 | -40.868 | +0.26 | INCREASED |
| 1548.7 | -45.146 | -44.577 | +0.57 | INCREASED |
| 1548.8 | -53.330 | -52.187 | +1.14 | INCREASED |
| 1548.9 | -65.036 | -65.115 | -0.08 | DECREASED |
| 1549.0 | -63.886 | -64.249 | -0.36 | DECREASED |

PORT MONITORING DEVICE AND PORT MONITORING METHOD

CROSS-REFERENCE TO RELATED APPLICATION

This application is based upon and claims the benefit of priority of the prior Japanese Patent Application No. 2013-086104, filed on Apr. 16, 2013, the entire contents of which are incorporated herein by reference.

FIELD

The embodiment discussed herein is related to a port monitoring device and a port monitoring method.

BACKGROUND

Increased complexity of networks in optical transmission systems today has brought an increasing need for functionality (colorless, directionless, and contentionless [CDC] functionality) that enables any terminal to transmit an optical signal on any wavelength channel in any path regardless of the source of the optical signal. In implementing such functionality, performances (such as an optical power level, the number of wavelength channels, and a state of wavelength channels) on all the transmission paths are monitored with optical channel monitors (OCMs) so that stable transmission quality is secured in the optical transmission systems. In related optical transmission systems, different OCMs are installed in respective transmission paths for the purpose of monitoring. With an increase in the number of transmission paths to be monitored, it will be difficult to install OCMs in all the transmission paths because installation costs will increase. Technologies, therefore, have been developed in which one OCM monitors a plurality of transmission paths by sequentially switching ports using an optical switch. Related technologies are described in Japanese Laid-open Patent Publication No. 2012-105222 and Japanese Laid-open Patent Publication No. 2008-197043, for example.

When monitoring a transmission path, the OCM monitors presence or absence of signals of wavelength division multiplexing (WDM), and calculates, for example, the central wavelength and optical power level. It usually takes approximately 250 ms for the OCM to complete the calculation for all the wavelength bandwidths (channels) in use. Thus, as the number of transmission paths (ports) to be monitored increases, waiting time (monitor polling time) before the start of monitoring at each port increases. The OCM is not capable of detecting events (such as change in the number of wavelength channels, switching of transmission paths, and signal stop) immediately if such events occur during the waiting time. Consequently, it takes more time before proceeding to the next control processing, thereby degrading the transmission quality of optical signals in some cases.

SUMMARY

According to an aspect of the embodiments, a port monitoring device monitors a plurality of ports by switching the ports each receiving an optical signal. The port monitoring device includes a detection unit, a determination unit, and an arithmetic unit. The detection unit detects an optical power level on optical wavelengths spaced at predetermined intervals in each of the ports to be monitored. The determination unit determines, in each of the ports, whether arithmetic processing using a waveform estimated from the optical power level is executed, depending on presence or absence of a change in the optical power level detected by the detection unit. The arithmetic unit executes the arithmetic processing using the waveform when the determination unit determines execution of the arithmetic processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating monitor polling time requested in the normal operation and requested when the optical power level has changed;

FIG. 6A is a diagram illustrating increase or decrease in measured values of the optical power level obtained when the central wavelength shifts to a longer wavelength;

FIG. 6B is a diagram illustrating increase or decrease in measured values of the optical power level obtained when the central wavelength shifts to a shorter wavelength;

FIG. 8A is a diagram illustrating increase or decrease in measured values of the optical power level obtained when the optical power is increased;

FIG. 8B is a diagram illustrating increase or decrease in measured values of the optical power level obtained when the optical power is decreased;

FIG. 11 is a diagram illustrating differences in measured values of the optical power level on wavelengths spaced at 0.1 nm intervals before and after the change of the central wavelength.

DESCRIPTION OF EMBODIMENTS

Preferred embodiments will be explained with reference to accompanying drawings. It is noted that the embodiment below does not limit the scope of the port monitoring device and the port monitoring method disclosed in the present invention.

Figure 1:
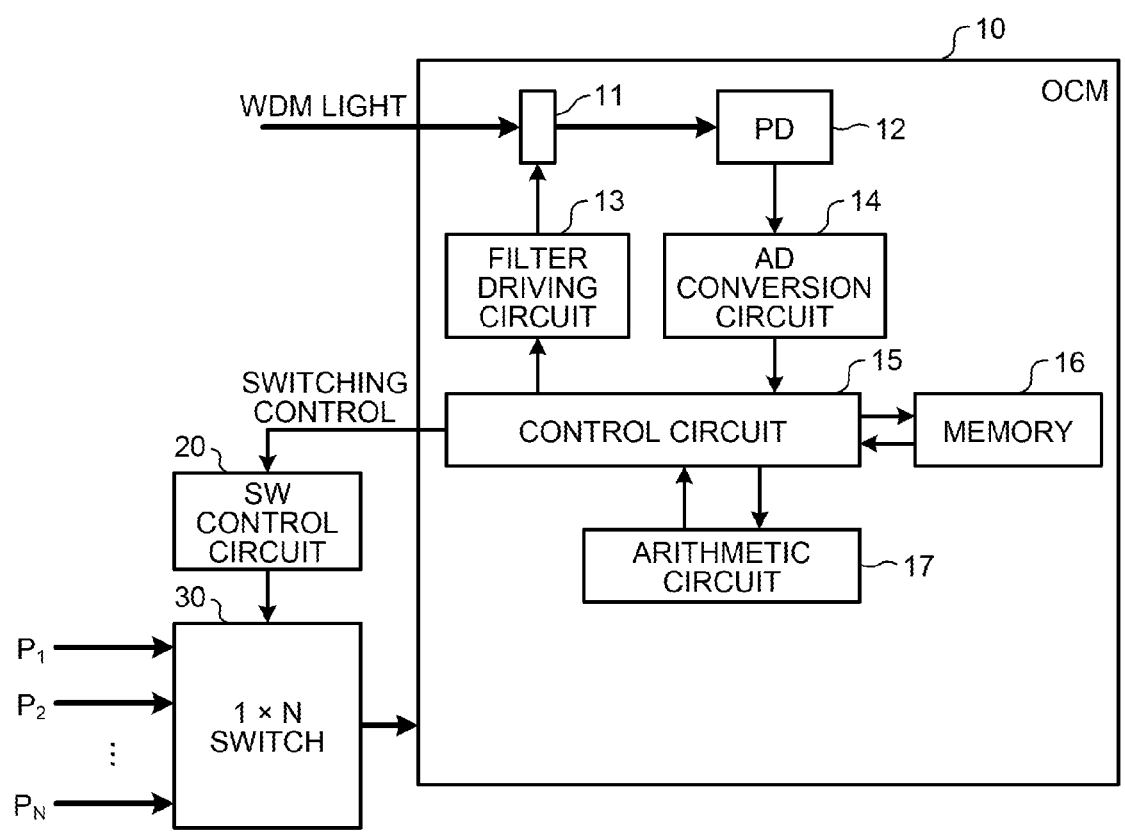
FIG. 1 is a block diagram illustrating a configuration of an OCM.

First, described is a configuration of an OCM according to an embodiment of the present invention. FIG. 1 is a block diagram illustrating a configuration of an OCM 10. As illustrated in FIG. 1, the OCM 10 includes a tunable band pass filter (TBPF) 11, a photo diode (PD) 12, a filter driving circuit 13, an analog to digital (AD) conversion circuit 14, a control circuit 15, a memory 16, and an arithmetic circuit 17. These units are connected in a manner in which signals and data can be input and output unidirectionally or bidirectionally. Among the arrows illustrated in FIG. 1, the bold arrows indicate an optical signal, and the thin arrows indicate an electrical signal.

The OCM 10 variably controls the central wavelength of the TBPF 11 to successively change wavelengths passing through the TBPF 11, and measures, with the PD 12, optical power level on wavelengths spaced at predetermined intervals. The OCM 10 stores measured values of the optical power level together with wavelength information in the memory 16 at the time of starting up. When the OCM 10 starts up, or detects a change in the optical power level, the OCM 10 performs firmware calculations in the arithmetic circuit 17. In other cases, the OCM 10 only compares measured values of the optical power level.

The TBPF 11 is a filter that sweeps wavelengths passing through a narrow band filter by thermal control or control on a filter rotation angle. The TBPF 11 outputs, to the PD 12, optical signals of a part of wavelengths among all the wavelengths of WDM input to the TBPF 11. The PD 12 converts an optical signal input from the TBPF 11 into an electric current to output to the AD conversion circuit 14 as an electric signal. The filter driving circuit 13 controls a variable element in the TBPF 11. When, for example, the TBPF 11 is thermally controlled, the filter driving circuit 13 is a heater driving circuit. When, for example, the TBPF 11 is controlled by rotation angles, the filter driving circuit 13 is a motor driving circuit. The AD conversion circuit 14 converts the electric signal (analog signal) input from the PD 12 into a digital signal that can be used in the arithmetic circuit 17.

The control circuit 15 stores values input from the AD conversion circuit 14 in the memory 16, and reads them out from the memory 16. The control circuit 15 compares data input to and output from the arithmetic circuit 17, or controls the filter driving circuit 13. The memory 16 stores therein information such as wavelength information of International Telecommunication Union-Telecommunication (ITU-T), the number of input ports (SW port count to be described later) to be switched, and measured values of the optical power level on respective wavelengths. The arithmetic circuit 17 estimates a waveform of an optical signal, calculates a central wavelength $\lambda_n$, or calculates the optical power level based on measured values of the optical power level on the respective wavelengths.

A switch (SW) control circuit 20 performs current drive to control a 1×N switch 30 to switch SW ports $P_1$ to $P_N$ (N is an integer equal to or larger than two) serving as input ports. Although the SW control circuit 20 illustrated in FIG. 1 is separated from the OCM 10, the SW control circuit 20 may be installed in the OCM 10.

The 1×N switch 30 is an optical switch including N SW ports $P_1$ to $P_N$ and one output port.

Figure 2:
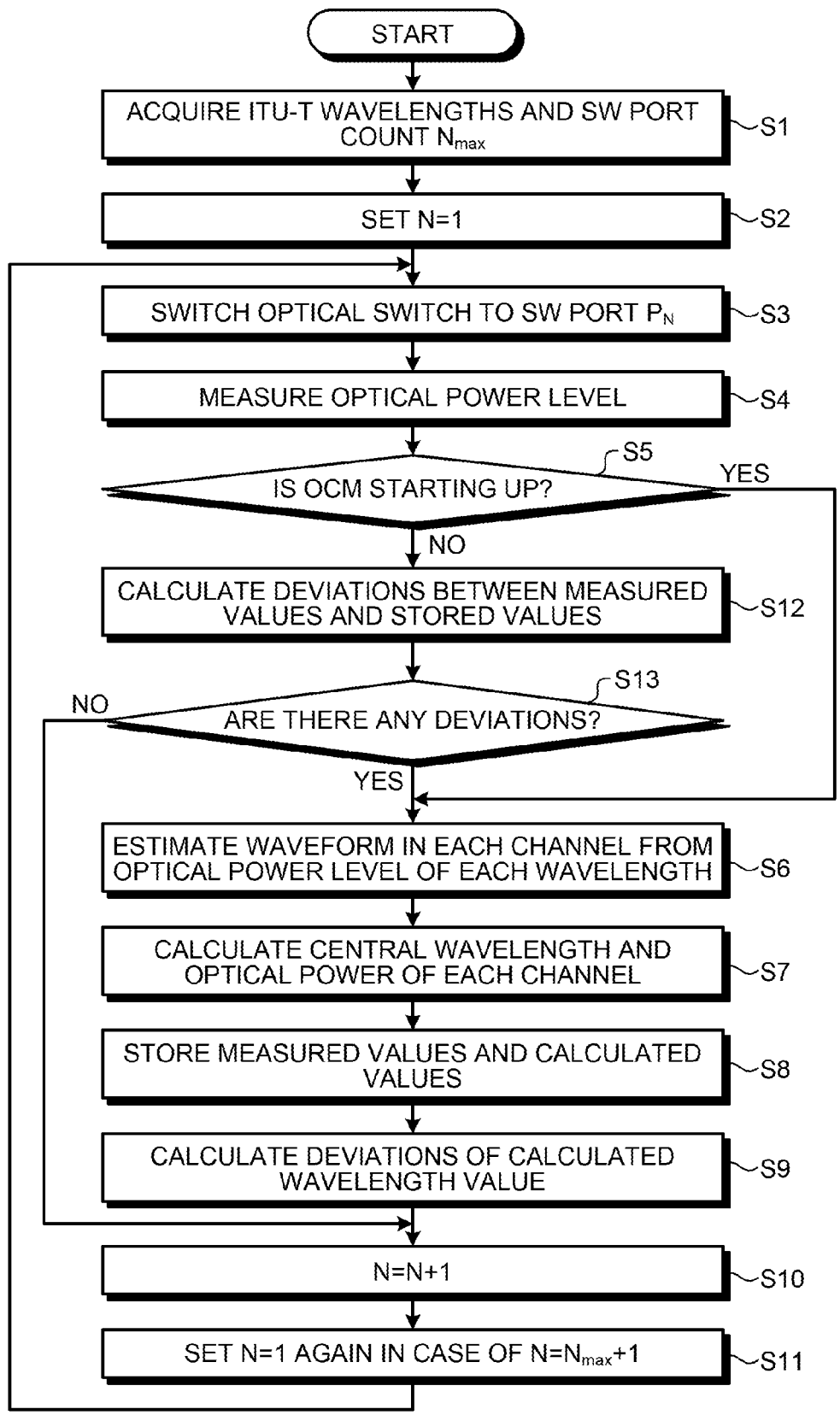
FIG. 2 is a flowchart for explaining the operation of the OCM.

Next, described is the operation of the OCM 10. FIG. 2 is a flowchart for explaining the operation of the OCM 10. At S1, the control circuit 15 acquires, from the memory 16, wavelength information of ITU-T indicating which channel is assigned to which wavelength, and the maximum number $N_{max}$ (such as four) of SW port count N. At S2, the control circuit 15 sets N=1 to be the initial value of a SW port number.

At S3, the 1×N switch 30 switches an optical switch to a SW port $P_N$. At S4, the PD 12 measures the optical power level of wavelengths spaced at predetermined intervals (such as about 2 nm) on the SW port $P_N$.

At S5, the control circuit 15 determines whether the OCM 10 is starting up at the present point of time. When the control circuit 15 determines that the OCM 10 is starting up at the present point of time (Yes at S5), the arithmetic circuit 17 estimates waveforms of respective channels from the measurement results (raw data) of the optical power level at S4 (S6). At S7, the arithmetic circuit 17 calculates the central wavelengths $\lambda_n$ and optical power of the respective channels based on the waveforms estimated at S6. At S8, the control circuit 15 stores, in the memory 16, measured values (raw data) of the optical power level obtained at S4, and calculation results (calculation values) obtained at S6 and S7.

At S9, the arithmetic circuit 17 subtracts an ITU-T wavelength from a calculated value of a wavelength stored in the memory 16 at S8 to calculate a deviation of the calculated wavelength from the ITU-T wavelength. At S10, the control circuit 15 adds one to the SW port number N. When the SW port number N is $N_{max}+1$ ($N_{max}$ is the maximum number of the SW port number N) as a result of the addition of one to N, the control circuit 15 sets N=1 in the SW port number N again (S11). When the SW port number N is not $N_{max}+1$, the processing at S11 is omitted.

After S11, the process returns to S3, and the OCM 10 executes processing at S3 and later again.

When the control circuit 15 determines that the OCM 10 is not starting up at the present point of time (No at S5), the arithmetic circuit 17 calculates deviations between measured values (raw data) of the optical power level at S4 and measured values (stored values of raw data) previously stored in the memory 16 (S12). When any deviation is obtained as a result of the calculation, the control circuit 15 determines that the optical power level on each wavelength has changed (Yes at S13), and continues the processing at S6 and later as described above. When no deviation is obtained as a result of the calculation, the control circuit 15 determines that the optical power level on each wavelength has not changed (No at S13), and skips the processing from S6 to S9 and performs the processing at S10 and later.

Although the control circuit 15 determines, at S13, whether to perform the processing at S6 and later based on presence or absence of a change in the optical power level on each wavelength, the control circuit 15 may perform the determination based on whether an amount of the change reaches a predetermined threshold. This can prevent the arithmetic circuit 17 from calculating the central wavelength $\lambda_n$ and the optical power in a case in which a very small change in the optical power level occurs that is not necessarily adjusted, thereby enabling more efficient calculation of deviations.

Among S1 to S13 described above, processing at S1 to S5, and S10 to S13 is performed by hardware control requiring short processing time (such as about 10 ms), whereas processing from S6 to S9 is performed by firmware calculations requiring long processing time (such as about 200 ms). The processing from S6 to S9 performed by the OCM 10 is limited to a case in which the OCM 10 is starting up or measured values of the optical power level have changed. This can reduce processing by firmware to a larger extent, thereby reducing the monitor polling time.

Figure 3A:
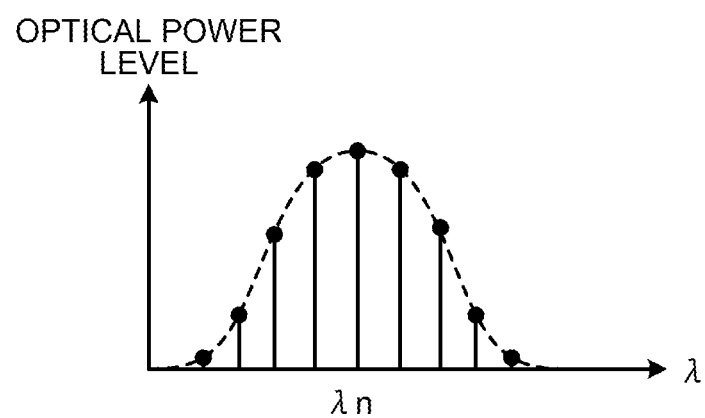
FIG. 3A is a diagram for explaining a monitoring method performed when the OCM starts up, or an optical power level has changed.

FIG. 3A is a diagram for explaining a monitoring method performed when the OCM 10 starts up, or the optical power level has changed. As illustrated in FIG. 3A, the OCM 10 performs monitoring in a related manner. In other words, the control circuit 15 sweeps the TBPF 11 in the positive direction of optical wavelength λ to read the optical power level (power components as raw data) on wavelengths spaced at predetermined intervals, and stores values of the optical power level in the memory 16. The values read by the control circuit 15 is used for determination whether values of the optical power level obtained in the normal operation to be described later have changed from the initial values or values read at the previous time. The arithmetic circuit 17 estimates the waveform illustrated in FIG. 3A based on the values of the optical power level thus read, and calculates the central wavelength $\lambda_n$ and an optical power (calculation result of the integral of the power components) of this waveform. The calculated values are also stored in the memory 16 together with the values of the optical power levels read by the control circuit 15. The calculated values are used to calculate how much the central wavelength $\lambda_n$ deviates and the optical power has changed.

Figure 3B:
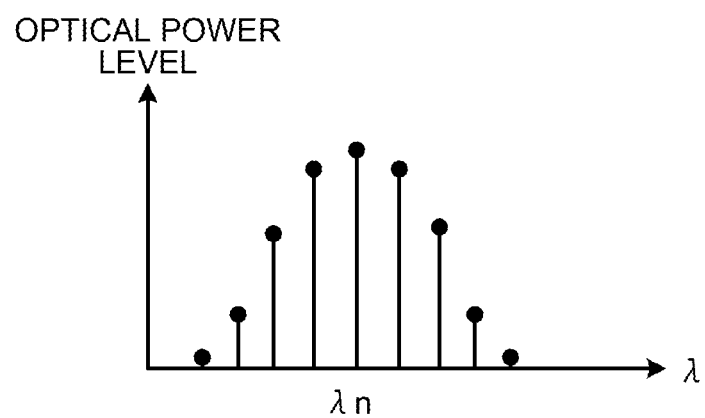
FIG. 3B is a diagram for explaining a monitoring method in a normal operation.

FIG. 3B is a diagram for explaining a monitoring method in the normal operation. As illustrated in FIG. 3B, the OCM 10 performs monitoring in a manner different from the related manner. In other words, the control circuit 15 sweeps the TBPF 11 in the positive direction of the optical wavelength λ to read the optical power level (power components as raw data) of wavelengths spaced at predetermined intervals, and stores the values in the memory 16. The values read by the control circuit 15 is used to determine whether the values thus read has changed from the values (raw data) of the optical power level obtained at the start-up of the OCM 10 described above. In the normal operation, calculation by the arithmetic circuit 17 is not performed, so that the calculation time, which accounts for a large proportion of total monitoring time, is "0". This enables the OCM 10 to reduce the monitor polling time for each port even when the number of SW ports to be monitored increases.

Next, described is the monitor polling time in the present embodiment when the SW port count is four, for example. FIG. 4 is a diagram illustrating the monitor polling time requested in the normal operation and requested when the optical power level has changed. Although FIG. 4 illustrates a case of N=4, N may be an integer equal to or larger than two. Assume that, in FIG. 4, monitoring time by hardware per port is "20 ms", and the total monitoring time including arithmetic processing is "250 ms". When no change occurs in the optical power level from that measured at the start-up of the OCM 10, the OCM 10 only performs monitoring by hardware, thus the total monitor polling time for four ports is 80 ms (obtained by 20 ms×4) as illustrated in FIG. 4. When there is a port (such as a port $P_2$) with the optical power level changed from that measured at the start-up of the OCM 10, the OCM 10 performs arithmetic processing on that port after the monitoring by hardware. When the arithmetic processing requests, for example, "230 ms", the monitor polling time for four ports is 310 ms (obtained by 20 ms×3+20 ms+230 ms) in total.

When the OCM 10 monitors more ports, for example, 16 ports, the related method in which arithmetic processing is performed on each port requests about four seconds to complete the monitoring on all ports. The method according to the present embodiment in which arithmetic processing is not performed on each port requests only about 320 ms for monitoring all the ports. Thus, the method according to the present embodiment can substantially reduce the monitor polling time.

Figure 5A:
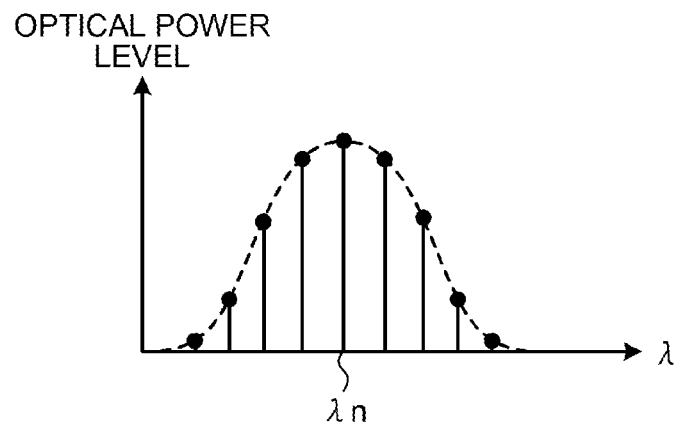
FIG. 5A is a diagram illustrating the optical power level on each wavelength obtained when no change occurs in the optical power level.

FIG. 5A is a diagram illustrating the optical power level on each wavelength obtained when no change occur in the optical power level. As illustrated in FIG. 5A, measured values of the optical power level indicated by the black points are the same as the initial values or values measured at the previous time.

Figure 5B:
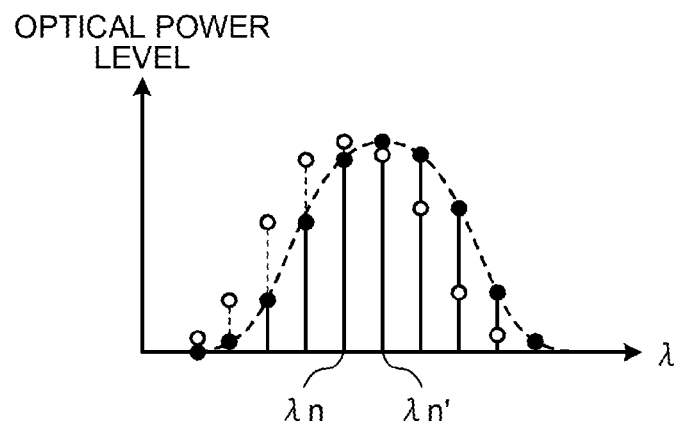
FIG. 5B is a diagram illustrating the optical power level on each wavelength obtained when the central wavelength has changed.

FIG. 5B is a diagram illustrating the optical power level on each wavelength obtained when the central wavelength $\lambda_n$ has changed. When the central wavelength $\lambda_n$ has changed to a central wavelength $\lambda_{n'}$ as illustrated in FIG. 5B, measured values of the optical power level indicated by the white points have changed to measured values indicated by the black points, accordingly, due to the change. The control circuit 15 of the OCM 10 estimates that the central wavelength $\lambda_n$ has changed because some wavelengths have increased optical power level values and other wavelengths have decreased optical power level values.

Figure 5C:
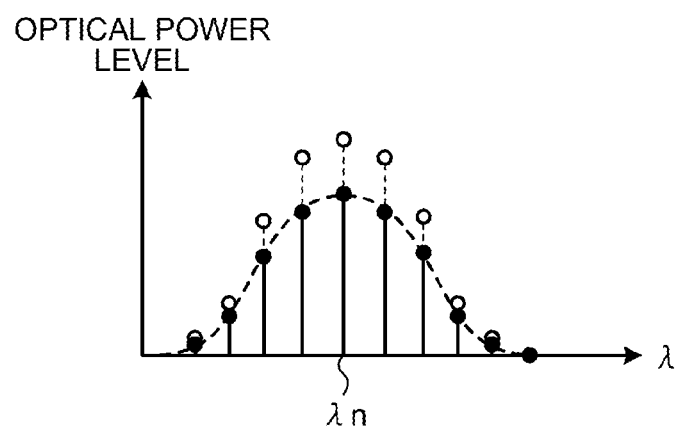
FIG. 5C is a diagram illustrating the optical power level on each wavelength obtained when optical power has changed.

FIG. 5C is a diagram illustrating the optical power level on each wavelength obtained when the optical power has changed. When the optical power has changed (decreased) as illustrated in FIG. 5C, measured values of the optical power level indicated by the white points have changed to measured values indicated by the black points, accordingly. The control circuit 15 of the OCM 10 estimates that the optical power has changed because each wavelength has an increased or decreased optical power level value.

As described above, the OCM 10 reads the optical power level value on the same wavelengths every time. This enables the OCM 10 to precisely estimate whether a wavelength shift or a power change has occurred by comparing values of the optical power level on each wavelength, or comparing values of the optical power level on a wavelength indicating the peak. In other words, the OCM 10 can precisely estimate that a change in a waveform is attributable to the change in the central wavelength $\lambda_n$ or attributable to the change in the optical power by detecting how measured values of the optical power level have changed on the respective wavelengths. When the OCM 10 estimates that a wavelength shift or a power change has occurred, the OCM 10 performs the arithmetic processing in the same manner as the OCM 10 does at the time of starting up to precisely obtain how much the central wavelength $\lambda_n$ shifts, or how much the optical power changes.

FIG. 6A is a diagram illustrating increase or decrease in measured values of the optical power level obtained when the central wavelength $\lambda_n$ shifts to a longer wavelength. As illustrated in FIG. 6A, increase or decrease in the measured values of the optical power level differs depending on wavelengths. In FIG. 6A, measured values of the optical power level are smaller than the initial measured values on wavelengths equal to or below 1548.5 nm, whereas, on wavelengths equal to or above 1548.6 nm, measured values of the optical power level are larger than the initial values. FIG. 6B is a diagram illustrating increase or decrease in measured values of the optical power level obtained when the central wavelength $\lambda_n$ shifts to a shorter wavelength. As illustrated in FIG. 6B, increase or decrease in the measured values of the optical power level differs depending on the wavelengths. In FIG. 6B, measured values of the optical power level are larger than the initial measured values on wavelengths equal to or below 1548.4 nm, whereas, on wavelengths equal to or above 1548.5 nm, measured values of the optical power level are smaller than the initial values.

Figure 7A:
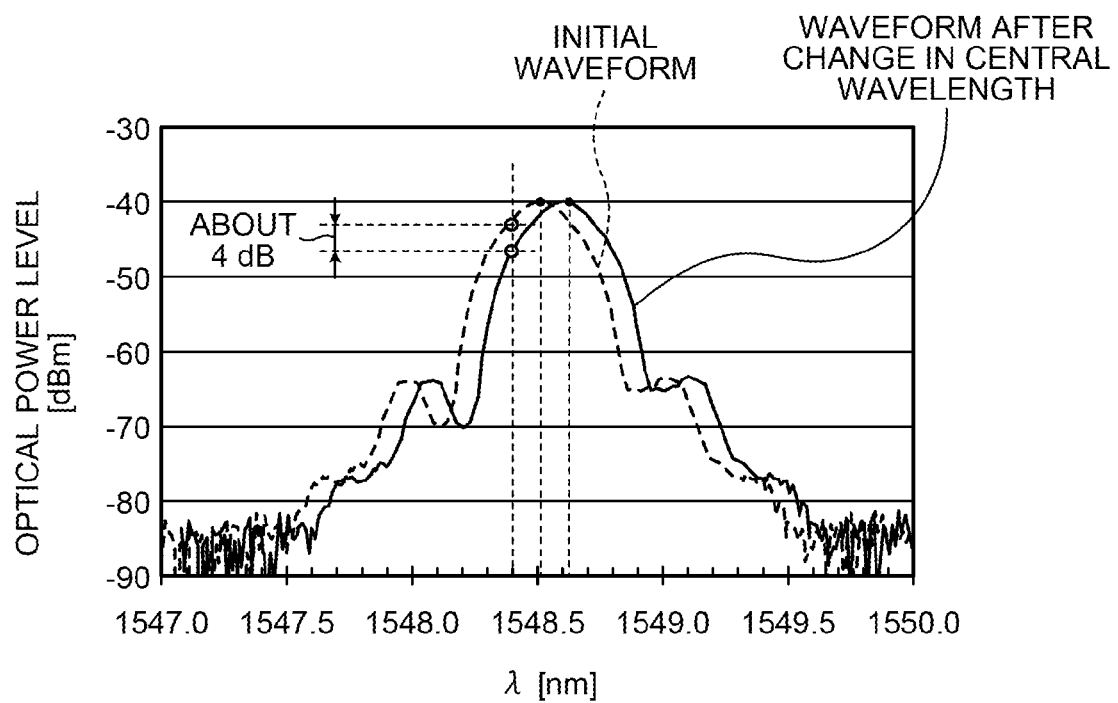
FIG. 7A is a diagram illustrating a change in an optical waveform when the central wavelength shifts to a longer wavelength.
Figure 7B:
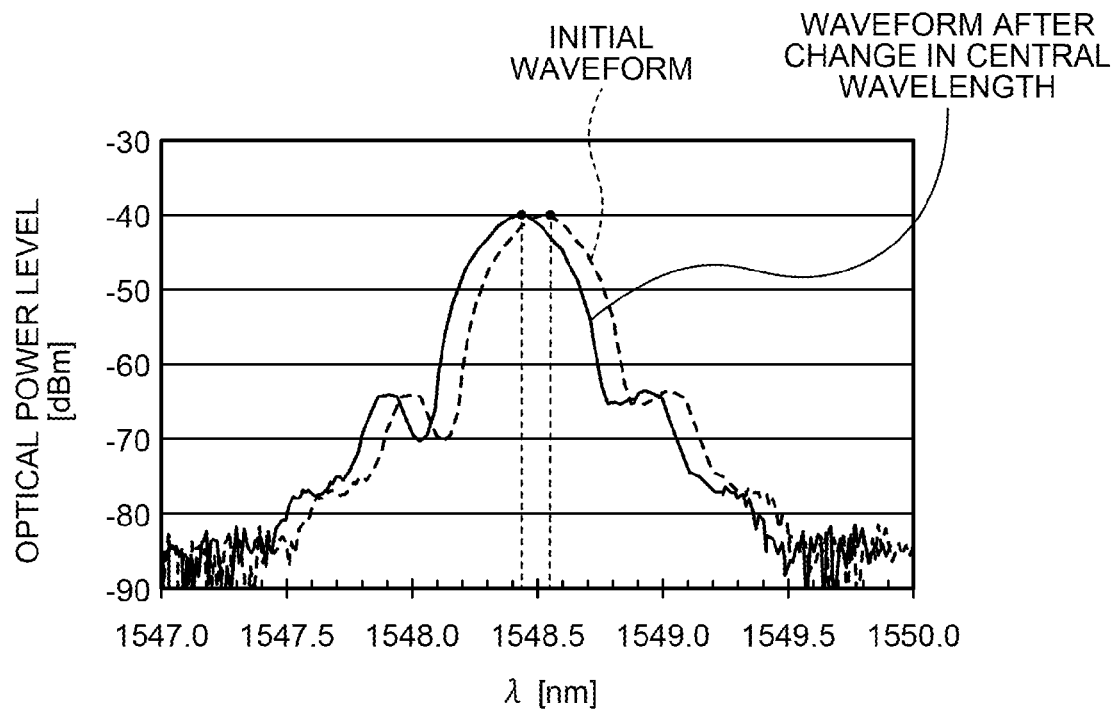
FIG. 7B is a diagram illustrating a change in an optical waveform when the central wavelength shifts to a shorter wavelength.

FIG. 7A is a diagram illustrating a change in an optical waveform when the central wavelength $\lambda_n$ shifts to a longer wavelength. FIG. 7A corresponds to FIG. 6A, and illustrates actual values of differential phase shift keying (DPSK) waveform data at 40 G measured when the central wavelength $\lambda_n$ shifts to a longer wavelength by about 0.1 nm. The broken line in FIG. 7A indicates an initial waveform (waveform before shifting of the central wavelength $\lambda_n$), and the solid line in FIG. 7A indicates a waveform after shifting of the central wavelength $\lambda_n$. FIG. 7B is a diagram illustrating a change in an optical waveform when the central wavelength $\lambda_n$ shifts to a shorter wavelength. FIG. 7B corresponds to FIG. 6B, and illustrates actual values of the DPSK waveform data at 40G measured when the central wavelength $\lambda_n$ shifts to a shorter wavelength by about 0.1 nm. The broken line in FIG. 7B indicates the initial waveform (waveform before shifting of the central wavelength $\lambda_n$), and the solid line in FIG. 7B indicates a waveform after shifting of the central wavelength $\lambda_n$.

The OCM 10 can detect presence or absence of a wavelength shift that is a cause of a change in the central wavelength $\lambda_n$ by determining how the measured values of the optical power level around the center of the DPSK waveform increase or decrease. At this time, in order for the OCM 10 to perform precise estimation, the OCM 10 defines a range of wavelengths each having a measured value of the optical power level that is about 20 dB smaller than the peak value, about −40 dBm, to determine increase or decrease in measured values of the optical power level. The range of wavelengths corresponds to a range (shaded part) of the wavelengths from 1548.2 nm to 1548.8 nm illustrated in FIGS. 6A and 6B.

As illustrated in FIG. 7A, the wavelength (the central wavelength $\lambda_n$) that has the peak value of the optical power level has changed from about 1548.5 nm to about 1548.6 nm. In FIG. 7B, the wavelength (the central wavelength $\lambda_n$) that has the peak value of the optical power level has changed from about 1548.5 nm to about 1548.4 nm. In either case, the optical power level is increased on wavelengths on the side to which the central wavelength has shifted, while the optical power level is decreased on wavelengths on the side from which the central wavelength has shifted. FIGS. 7A and 7B illustrate an example of a wavelength shift of 0.1 nm. With such a small wavelength shift, a change in the optical power level occurs by about 4 dB (see FIG. 7A). Considering that the OCM 10 normally monitors the optical power level at an accuracy of about 0.2 dB, it is obvious that the OCM 10 can sufficiently detect presence or absence of a wavelength shift.

FIG. 8A is a diagram illustrating increase or decrease in measured values of the optical power level obtained when the optical power is increased. As illustrated in FIG. 8A, all the measured values of the optical power level are larger than the initial values irrespective of whether the wavelengths are long or short. FIG. 8B is a diagram illustrating increase or decrease in measured values of the optical power level obtained when the optical power is decreased. As illustrated in FIG. 8B, all the measured values of the optical power level are smaller than the initial values irrespective of whether the wavelengths are long or short.

Figure 9A:
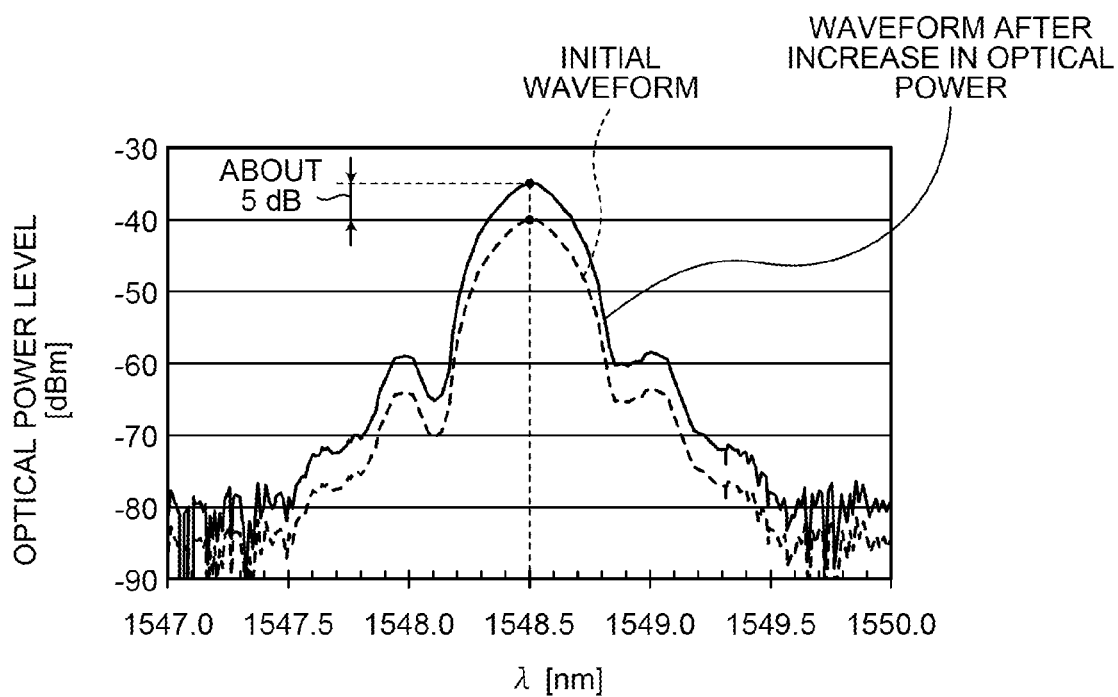
FIG. 9A is a diagram illustrating a change in an optical waveform when the optical power is increased.
Figure 9B:
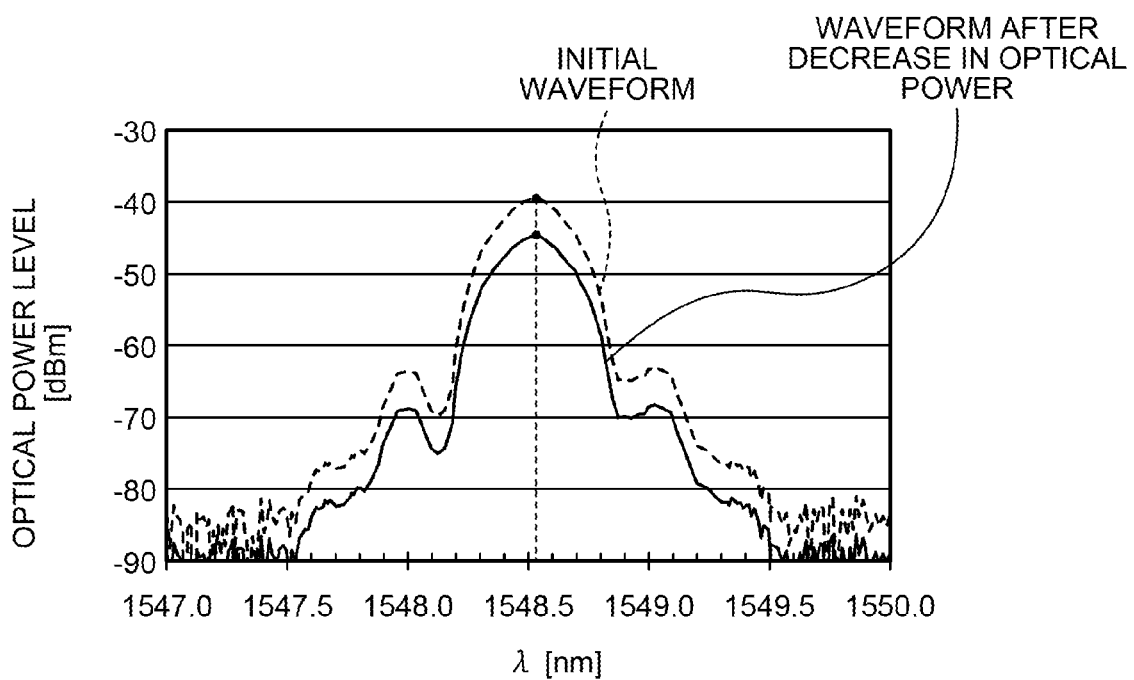
FIG. 9B is a diagram illustrating a change in an optical waveform when the optical power is decreased.

FIG. 9A is a diagram illustrating a change in an optical waveform when the optical power is increased. FIG. 9A corresponds to FIG. 8A, and illustrates actual values of DPSK waveform data at 40 G measured when the peak value of the optical power level is increased by about 5 dB. The broken line in FIG. 9A indicates the initial waveform (waveform before the optical power is increased), and the solid line in FIG. 9A indicates a waveform after the optical power is increased. FIG. 9B is a diagram illustrating a change in an optical waveform when the optical power is decreased. FIG. 9B corresponds to FIG. 8B, and illustrates actual values of DPSK waveform data at 40 G measured when the peak value of the optical power level is decreased by about 5 dB. The broken line in FIG. 9B indicates the initial waveform (waveform before the optical power is decreased), and the solid line in FIG. 9B indicates a waveform after the optical power is decreased.

The OCM 10 can detect presence or absence of a change in the optical power by determining that measured values of the optical power level on wavelengths around the center of the DPSK waveform are uniformly increased or decreased. At this time, in order for the OCM 10 to perform precise estimation, the OCM 10 defines a range of wavelengths each having a measured value of the optical power level that is about 20 dB smaller than the peak value, about −40 dBm, to determine increase or decrease in measured values of the optical power level. The range of wavelengths corresponds to a range (shaded part) of the wavelengths from 1548.2 nm to 1548.8 nm illustrated in FIGS. 8A and 8B.

Although the central wavelength $\lambda_n$ is not changed in FIG. 9A, the peak value of the optical power level is increased from about −40 dBm to about −35 dBm. Although the central wavelength $\lambda_n$ is not changed in FIG. 9B, the peak value of the optical power level is decreased from about −40 dBm to about −45 dBm. In either case, not only the peak value but all values of the optical power level are increased or decreased throughout all the wavelengths from 1548.0 nm to 1549.0 nm. FIGS. 9A and 9B illustrate an example of a change in the optical power level by 5 dB. Considering that the OCM 10 normally monitors the optical power level at an accuracy of about 0.2 dB, it is obvious that the OCM 10 can sufficiently detect presence or absence of a change in the optical power.

The OCM 10 can detect a change in the central wavelength $\lambda_n$ by monitoring a change in measured values of the optical power level on each wavelength even when the central wavelength $\lambda_n$ is only deviated by about 0.01 nm. The following verifies that the OCM 10 according to the present embodiment can detect a deviation in wavelengths by about 0.01 nm with reference to FIGS. 10A, 10B, and 11.

Figure 10A:
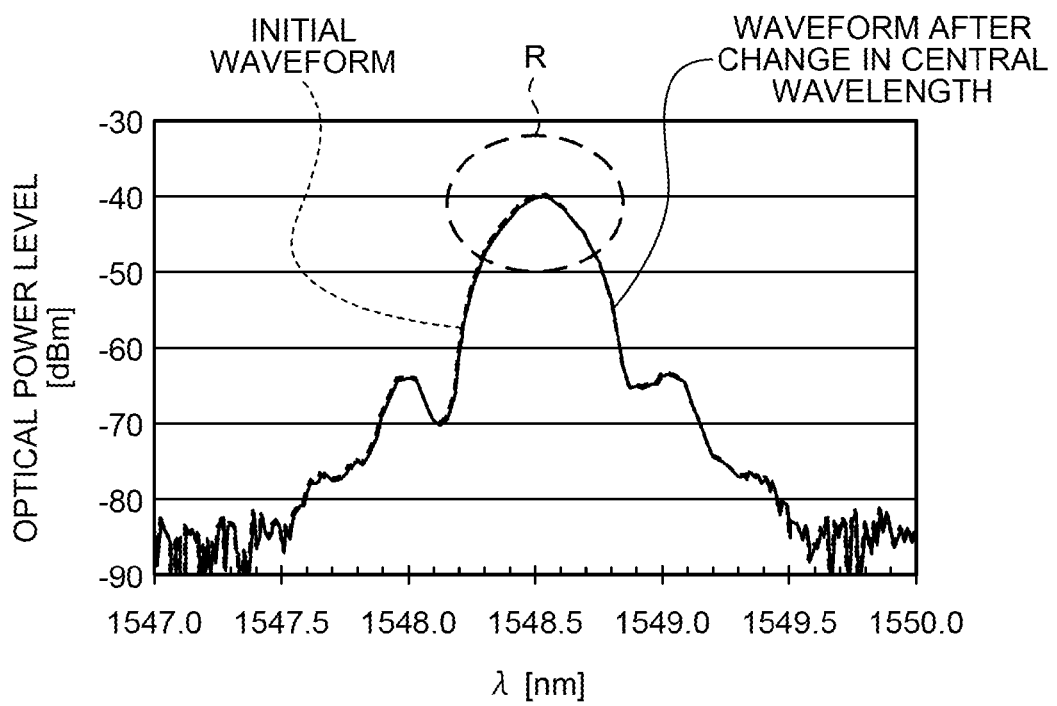
FIG. 10A is a diagram illustrating a change in the optical waveform when the central wavelength shifts to a longer wavelength by 0.01 nm.
Figure 10B:
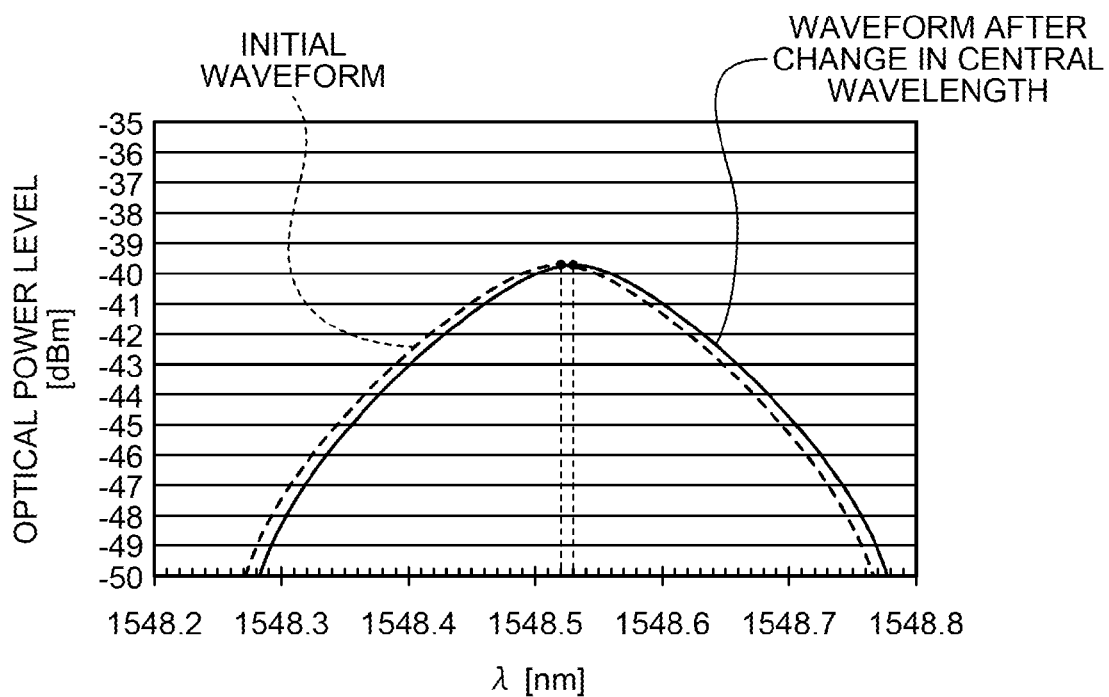
FIG. 10B is a partially enlarged diagram illustrating a change in the optical waveform in a range with the optical power level of −50 dBm or larger.

FIG. 10A is a diagram illustrating a change in the optical waveform when the central wavelength $\lambda_n$ shifts to a longer wavelength by 0.01 nm. FIG. 10B is a partially enlarged diagram illustrating a change in the optical waveform in a range R with the optical power level of −50 dBm or larger. In FIGS. 10A and 10B, the broken line indicates the original DPSK waveform (initial waveform) at 40 G, and the solid line indicates a waveform shifted from the original waveform to the right (to a longer wavelength) by 0.01 nm. When the OCM 10 sweeps wavelengths from 1547.0 nm to 1550.0 nm with the TBPF 11, the OCM 10 measures the optical power level on wavelengths spaced at fixed (0.1 nm) intervals. FIG. 11 is a diagram illustrating differences in measured values of the optical power level on wavelengths spaced at 0.1 nm intervals before and after the change of the central wavelength $\lambda_n$. As illustrated in FIG. 11, a change in the central wavelength $\lambda_n$ only by 0.01 nm causes a difference of about 0.3 dB in the optical power level on wavelengths (about 1548.4 nm and about 1548.6 nm) 0.1 nm apart from the central wavelength $\lambda_n$ (about 1548.5 nm). Moreover, a change in the central wavelength $\lambda_n$ only by 0.01 nm causes a difference of larger than 0.5 dB in the optical power level on wavelengths (about 1548.3 nm and about 1548.7 nm) 0.2 nm apart from the central wavelength $\lambda_n$ (about 1548.5 nm). The amounts of the above-described differences in the optical power level are large enough for the OCM 10 according to the present embodiment to detect.

From the description above, the port monitoring method according to the present embodiment for monitoring measured values of the optical power level without performing arithmetic processing is determined to be effective in estimating presence or absence of a change in the central wavelength X, and a change in the optical power.

As described above, the OCM 10 monitors a plurality of SW ports $P_1$ to $P_N$ that receive optical signals by switching the ports. The OCM 10 includes the PD 12, the control circuit 15, and the arithmetic circuit 17. The PD 12 detects optical power level on optical wavelengths spaced at predetermined intervals for each of the SW ports $P_1$ to $P_N$ to be monitored. The control circuit 15 determines whether arithmetic processing using a waveform estimated from the detected optical power level is executed for each of the SW ports $P_1$ to $P_N$, depending on presence or absence of a change in the optical power level detected by the PD 12. When the control circuit 15 determines the execution of the arithmetic processing, the arithmetic circuit 17 performs the arithmetic processing using the above-described waveform.

In the OCM 10, the control circuit 15 may determine the execution of the arithmetic processing when the amount of change in the optical power level detected by the PD 12 exceeds a predetermined threshold. In the OCM 10, the arithmetic circuit 17 may calculate the central wavelength of the waveform described above, or the optical power obtained from the waveform, when the control circuit 15 determines the execution of the arithmetic processing.

A common OCM requests about 250 ms to sweep all the channels on WDM and complete calculation. When one OCM monitors many SW ports, the OCM monitors a SW port on a cycle (monitor polling time) of a few seconds. This means that each SW port is only monitored once in every few seconds. The OCM 10 according to the present embodiment stores hardware read values (raw data) that are used in the arithmetic processing in the memory 16 as initial values when the OCM 10 starts up. In normal monitoring operations, the OCM 10 compares values of the optical power level by only using the hardware read values. In other words, the OCM 10 omits time-consuming waveform estimation and arithmetic processing to reduce the monitor polling time. This enables the OCM 10 to detect events (such as a change in the number of wavelengths, switching of paths, signal stop, or anomalies in a transmission path) at an early stage to proceed to the next device control.

When measured values differ from the hardware read values because of such events described above, the OCM 10 performs detailed monitoring (such as scanning of hardware or calculation on firmware) in a normal mode only in a SW port in which the events occur. This gives the OCM 10 the central wavelength $\lambda_n$ and the optical power level of the SW port in which the events occur. The OCM 10, as a result, can have the same monitoring accuracy as that in the case in which the OCM 10 monitors only one port.

First Modification

When the control circuit 15 of the OCM 10 determines whether a change has occurred in measured values of the optical power level (S13 in FIG. 2), the control circuit 15 may weight a threshold used as a reference for the determination, according to a bit rate of an estimated waveform. In other words, the control circuit 15 may suitably change the threshold according to a transmission speed (bit rate) of optical signals on respective SW ports $P_1$ to $P_N$.

An optical transmission system, for example, includes SW ports with a small bit rate of 10 Gbps and SW ports with a large bit rate of 100 Gbps in some cases. Normally, when a bit rate is small, the optical waveform has a narrow bandwidth, whereas, when a bit rate is large, the optical waveform has a broad bandwidth. This means that, when a bit rate is small, even a small change in the central wavelength $\lambda_n$ causes a big change in the optical power level because the optical power level oversensitively responds. When a bit rate is large, a change in the central wavelengths $\lambda_n$ to some extent does not cause such a big change in the optical power level. In other words, even when the same amounts of change are obtained in measured values of the optical power level, the amounts of change in the central wavelength $\lambda_n$ are different depending on bit rates. When the control circuit 15 uses the same threshold in any case without considering bit rates, the control circuit 15 determines the execution of the arithmetic processing even in a case in which a change in the central wavelength $\lambda_n$ is negligible, whereby the process becomes inefficient. On the contrary, a case may occur in which the arithmetic processing, which is actually requested, is not executed because the amount of change in the optical power level is below a threshold.

The control circuit 15 of the OCM 10 estimates a bit rate from a waveform estimated by the arithmetic processing performed at the time of starting up of the OCM 10. The control circuit 15 weights a threshold used to determine whether a change has occurred in measured values of the optical power level based on the result of the estimation. In a case of the above-described DPSK waveform at 40 G, a waveform at 10 Gbps has a narrower bandwidth than that of a waveform having a higher bit rate of 100 Gbps. When the amount of change in the optical power level of the 10 Gbps waveform is the same as that of the 100 Gbps waveform, the actual amount of change in the central wavelength $\lambda_n$ of the 10 Gbps waveform is smaller than that of the 100 Gbps waveform. Accordingly, the control circuit 15 gives weighting to a SW port with a lower bit rate to set a larger threshold than that of a SW port with a higher bit rate. A waveform with a high bit rate such as 100 Gbps has a broad bandwidth, so that the amount of change in the optical power level in the 100 Gbps waveform is smaller than that of the 10 Gbps waveform even when the change in the central wavelength $\lambda_n$ is large. Accordingly, the control circuit 15 gives weighting to a SW port with a higher bit rate to set a smaller threshold than that of a SW port with a lower bit rate. This enables the control circuit 15 to adjust differences, due to differences in bit rates, in amounts of change in the optical power level depending on a bandwidth of a waveform. Thus, notwithstanding the bit rates of the SW ports $P_1$ to $P_N$, the OCM 10 can maintain accuracy in monitoring the SW ports $P_1$ to $P_N$, as well as can reduce waiting time before monitoring (increase monitoring time) for each of the SW ports $P_1$ to $P_N$.

The OCM 10 according to the first modification is particularly effective in monitoring optical signals to which the WDM is applied and that includes a plurality of signals having a different bit rate with each other.

In the embodiment above, the arithmetic processing includes waveform estimation processing, central wavelength $\lambda_n$ calculation processing, and optical power calculation processing that are performed when a change occurs in measured values in the optical power level. The arithmetic circuit 17 of the OCM 10, however, does not have to perform all three types of the arithmetic processing, but may only perform at least one type of processing among the three types of the arithmetic processing.

The constituent elements of the OCM 10 need not be physically configured as illustrated. In other words, the specific state of distribution and integration of units is not limited to be as illustrated, and all or a part of the units can be functionally or physically distributed or integrated according to various conditions of load and/or use. For example, the control circuit 15 and the arithmetic circuit 17, or the AD conversion circuit 14 and the control circuit 15 may be integrated as one constituent element. The port switching function of the 1×N switch 30 may be included in the OCM 10.

With regard to the control circuit 15, a part controlling the filter driving circuit 13 and a part comparing measured values of the optical power level may be separated. With regard to the arithmetic circuit 17, a part (waveform estimation calculation) estimating a waveform from measured values of the optical power level on respective wavelengths, a part (wavelength calculation) calculating the central wavelength $\lambda_n$ from the estimated waveform, and a part (power calculation) calculating the optical power by integrating the estimated waveform may be separated. The memory 16 as a storage unit storing various types of data (such as measured values and calculation results) may be an external device for the OCM 10, or an external device for the optical transmission system, and may be connected thereto via a network or a cable.

According to an aspect of a port monitoring device disclosed herein, waiting time before the start of monitoring can be reduced while maintaining accuracy in monitoring each port.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A port monitoring device that monitors a plurality of ports by switching the ports each receiving an optical signal, the port monitoring device comprising:

a detection unit that detects an optical power level on optical wavelengths spaced at predetermined intervals in each of the ports to be monitored;

a determination unit that determines, in each of the ports, whether arithmetic processing using a waveform estimated from the optical power level is executed, depending on presence or absence of a change in the optical power level detected by the detection unit; and an arithmetic unit that executes the arithmetic processing using the waveform when the determination unit determines execution of the arithmetic processing.

2. The port monitoring device according to claim 1, wherein the determination unit determines execution of the arithmetic processing when an amount of change in the optical power level detected by the detection unit exceeds a predetermined threshold.

3. The port monitoring device according to claim 1, wherein the arithmetic unit calculates central wavelength of the waveform, or optical power obtained from the waveform, when the determination unit determines execution of the arithmetic processing.

4. The port monitoring device according to claim 2, wherein the determination unit changes the predetermined threshold depending on a transmission speed of the optical signal transmitted in each of the ports.

5. A port monitoring method performed by a port monitoring device that monitors a plurality of ports by switching the ports each receiving an optical signal, the port monitoring method comprising:

detecting an optical power level on optical wavelengths spaced at predetermined intervals in each of the ports to be monitored;

determining, in each of the ports, whether arithmetic processing using a waveform estimated from the optical power level is executed, depending on presence or absence of a change in the optical power level detected at the detecting; and executing the arithmetic processing using the waveform when execution of the arithmetic processing is determined at the determining.

* * * * *